Sept. 14, 1965    C. S. BURLINGHAM    3,206,665
DIGITAL SPEED CONTROLLER
Filed Dec. 19, 1962    3 Sheets-Sheet 1

INVENTOR.
CHARLES S. BURLINGHAM
BY
Price & Heneveld

INVENTOR.
CHARLES S. BURLINGHAM
BY
Price & Heneveld

Sept. 14, 1965  C. S. BURLINGHAM  3,206,665

DIGITAL SPEED CONTROLLER

Filed Dec. 19, 1962  3 Sheets-Sheet 3

INVENTOR.
CHARLES S. BURLINGHAM

BY
Price & Heneveld

United States Patent Office 3,206,665
Patented Sept. 14, 1965

3,206,665
DIGITAL SPEED CONTROLLER
Charles S. Burlingham, Grand Rapids, Mich., assignor to Lear Siegler, Inc.
Filed Dec. 19, 1962, Ser. No. 245,711
11 Claims. (Cl. 318—312)

This invention concerns a servo system for controlling the average angular velocity of an electric motor with great precision, and more particularly a digital servo system in which the desired speed is expressed in terms of the repetition rate of a command pulse train, the velocity of the motor is expressed as the repetition rate of a feedback pulse train, the two pulse trains are fed to the count-up and count-down inputs, respectively, of a reversible binary counter, and the velocity control signal is determined at any instant by the total number of pulses stored in the binary counter.

It has previously been proposed, as for example in U.S. Patents No. 2,537,427 and 2,727,194 to Seid, to control the angular position of a servo by feeding to a counter an additive pulse train whose repetition rate was representative of the desired position, and a subtractive pulse train produced by a pulse generator controlled by the servo whose repetition rate was indicative of the position of the servo. The servo was then actuated by an error signal derived from the total number of pulses stored in the reversible counter at any moment.

The prior art systems of this type had one serious weakness, however: if the servo was unable to follow a change in command signal quickly enough, it was possible for the binary counter to become saturated (i.e. to hold a binary number of all ones). When this condition occurred, one additional pulse would change the contents of the counter to all zeros and apply full reverse torque to the servo. For this reason, elaborate circuitry was provided in the prior art to either give the counter sufficient capacity for any eventuality, or to apply a steady high driving torque to the servo by a switching process when the count in the counter exceeded a predetermined amount.

The present invention makes these expensive expedients unnecessary by automatically blocking the counter when it becomes saturated in either the positive (all ones) or the negative (all zeros) direction. Thus, the device of this invention achieves linear operation of the velocity control throughout the normal capacity range of the counter, and nonlinear (i.e. steady-state at miximum values) operation of the velocity control when the discrepancy between command feedback repetition rates becomes sufficient to saturate the counter. In effect, the present invention thus accomplishes the result sought by the aforementioned patents with considerably less circuitry, more accurately and reliably, and at considerably less expense.

In addition, the present invention provides a novel type of anti-coincidence circuit which prevents the simultaneous insertion into the computer of both a command pulse and a feedback pulse, and thus does away with the necessity for pulse synchronization which was required by the prior art.

Furthermore, the invention utilizes these features in providing a simple direction-sensitive circuit to control the motor in either direction of rotation.

It is therefore an object of this invention to provide a system of the type described which is capable of accepting command pulses and feedback pulses at any relative repetition rate and in any phase relation without impairing its control function.

It is a further object to provide a system of the type described which has a linear mode of operation within the capacity of the counter and a steady-state mode of operation beyond the capacity of the counter.

It is a still further object of the invention to provide a circuit of the type described which permits the use of relatively few counter stages in order to reduce the response time of the system so as to improve its accuracy.

It is still another object of this invention to provide a circuit of the type described which allows the use of a very high pulse repetition rate to improve the resolution of the system.

It is another object of the invention to provide a circuit of the type described which permits simple bidirectional control of the motor.

These and other objects of the invention will become apparent from a perusal of the following specification, taken in connection with the accompanying drawings in which.

Basically, the invention resides in providing gate circuits which prevent pulses from reaching the bidirectional counter if and when such pulses would cause oversaturation of the counter. In addition, the invention provides an anti-coincidence circuit capable of distributing random sequence pulses without requiring any synchronization, by passing non-coincident pulses without delay but delaying coincident pulses for a predetermined time.

Figure 1:
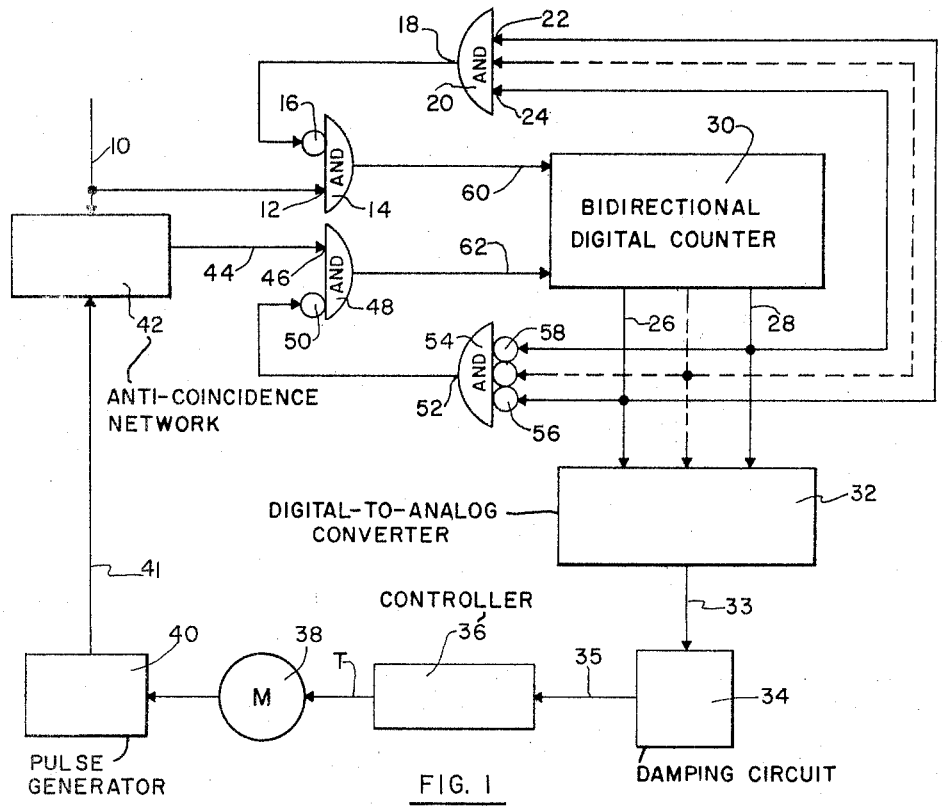
FIG. 1 is a generalized block diagram of the device of this invention.

It will be seen by referring to the dawings that the device of this invention includes a source of command pulses deliverable at a variable, precisely predeterminable repetition rate. As shown in FIG. 1, the train 10 of command pulses is delivered to the AND input 12 of a NOT-AND gate 14 which may be referred to as the up limit gate. The NOT input 16 of the NOT-AND gate 14 is derived from the output 18 of an AND gate 20 whose inputs 22 through 24 are the "one" or positive conditions of each stage output 26 through 28, respectively, of a binary counter 30. It will be seen that the output repetition rate of the NOT-AND gate 14 is equal to that of the command pulse train unless the binary counter is full, in which case there is no output from the NOT-AND gate 14.

The bidirectional binary counter 30 is so arranged that, for example, the "zero" condition of each stage represents a connection to a negative voltage supply, while the "one" condition corresponds to a connection to a positive voltage supply of the same absolute magnitude. Consequently, when the outputs 26 through 28 of the various stages of the bidirectional binary counter 30 are applied to a weighted resistor digital-to-analogue converter 32, the converter 32 will produce a bipolar D.C. voltage 33 which is zero when the counter is half full, negative maximum when it is empty, and positive maximum when it is full. The bipolar D.C. voltage produced by the converter 32 is next fed through a lead network 34 which smooths the sharp steps of the bipolar D.C. voltage to prevent hunting of the motor, and the smoothed voltage 35 is then supplied to a controller 36 whose structure depends on the nature of the motor 38, but which in any event is designed so as to apply to the motor 38 a torque T generally proportional in magnitude and sign to the voltage supplied to it by the lead network 34. For example, in the case of an A.C. motor, the controller may consist of a modulator 37 (FIG. 2) followed by an A.C. amplifier 39 (FIG. 2) whose output drives the motor 38.

If the counter 30 were fed only the command pulse train, it would soon fill up. To prevent this, the motor 38 is equipped with a pulse generator 40 which generates a feedback pulse train 41 with a pulse repetition rate proportional to the speed of motor 38. The feedback pulses generated by the pulse generator or quantizer 40 are fed first to an anti-coincidence circuit 42 where their phase is compared with the phase of the command pulses. If a feedback pulse is in phase with a command pulse, i.e. occurs simultaneously with a command pulse, the feedback pulse will be delayed until the counter has had a chance to count the command pulse. If a feedback pulse is not coincident with a command pulse, it passes through the anti-coincidence circuit undelayed. The purpose of this arrangement is to avoid feeding the counter two conflicting signals simultaneously. The feedback pulse train 44 emerging from the anti-coincidence circuit 42 is fed to the AND input 46 of a NOT-AND or inhibition gate 48 which may be referred to as the down limit gate. The NOT input 50 of the down limit gate 48 is derived from the output 52 of a NOT gate 54 whose inputs 56 through 58 are energized by the "one" conditions of the respective stage outputs 26 through 28 of the counter 30. Consequently, the NOT gate 54 will produce an output 52 whenever all the stages of the counter 30 are in the "zero" condition. The appearance of this output 52 of the NOT gate 54 at the NOT input 50 of the down limit gate 48 prevents further feedback pulses of the train 44 from reaching the counter 30. It will be understood that instead of making the gate 54 a NOT gate whose inputs are energized by the "one" conditions of the counter stage outputs as indicated in FIG. 1, it is equally possible to make the gate 54 an AND gate whose inputs are energized by the "zero" conditions of the various counter stage outputs (FIG. 2).

Figure 2:
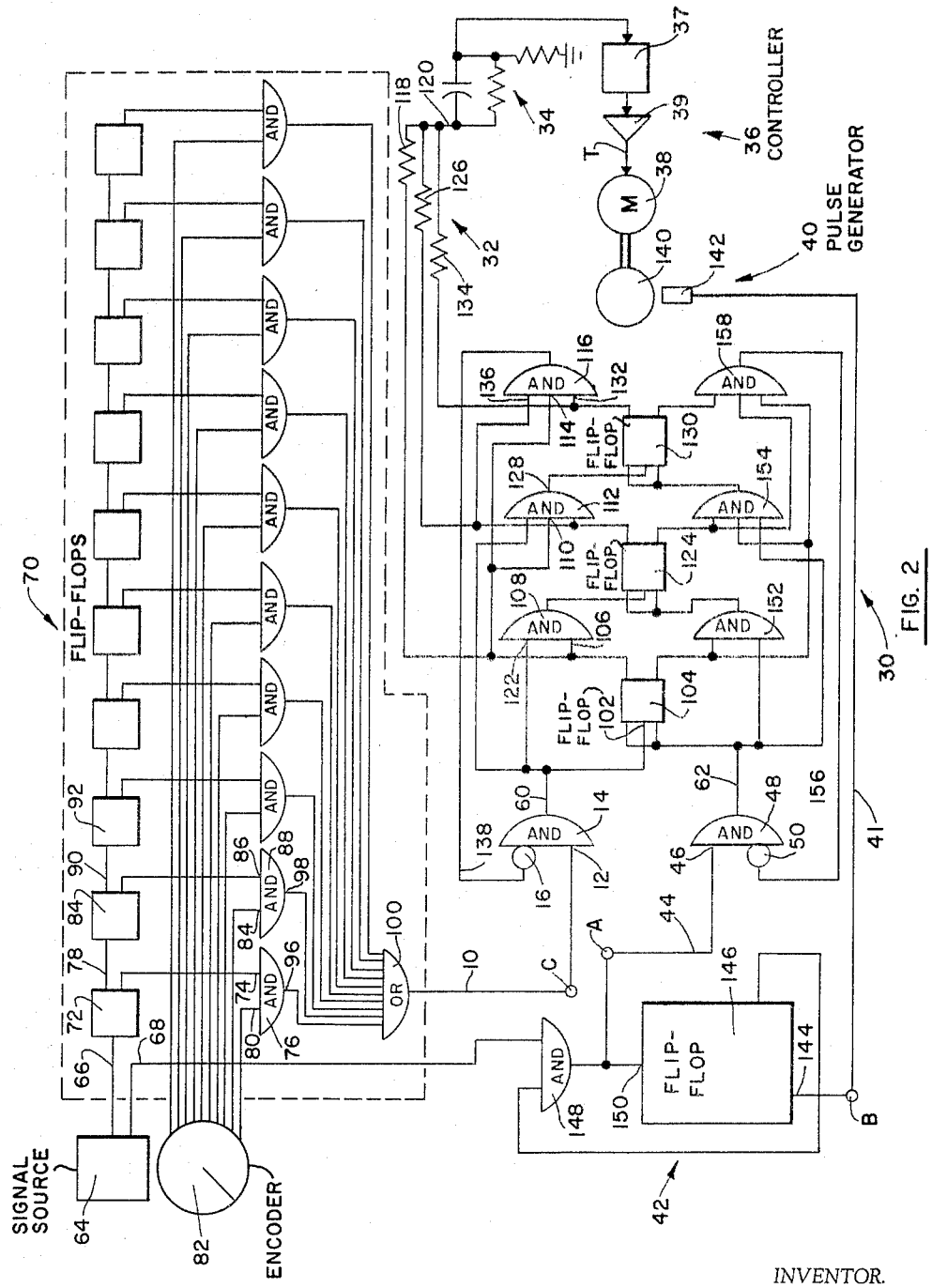
FIG. 2 is a logic diagram illustrating the unidirectional operation of the device with a three-stage counter and an anti-hunting circuit.

As best shown in FIG. 2, the output 60 of the up limit gate 14 is additively connected to the binary counter 30, whereas the output 62 of the down limit gate 48 is subtractively connected to the binary counter 30. In FIG. 2, a crystal controlled oscillator 64 produces a pair of pulse trains 66, 68 having repetition rates of $f$ and $2f$ respectively. The pulse train 66 is fed to a ten-stage rate multiplier 70. Each stage of the multiplier 70 consists of a flip-flop circuit such as 72 whose "one" position feeds a positive signal to the input 74 of an AND gate 76, and whose "zero" condition provides a trigger signal 78 for the next stage of the binary chain. The other input 80 of the AND gate 76 is derived from an appropriate encoder such as the ten bit shaft encoder 82 shown in FIG. 2. The trigger signal 78 triggers the flip-flop 84 whose "one" position provides a positive signal to the input 86 of the AND gate 88, whereas its "zero" condition provides a trigger signal 90 to the next flip-flop stage 92. The input 94 of AND gate 88 is energized by another output of the encoder 82. The outputs 96, 98 of the AND gates 76, 88, respectively, are fed to an OR gate 100 together with the outputs of all the other AND gates of the multiplier 70. The timing of the multiplier circuit is such that the output from no two of the AND gates of the multiplier 70 are ever coincident. It will be readily understood that the flip-flop 72 produces $f/2$ output pulses per unit time at 96, flip-flop 84 produces $f/4$ pulses per unit time at 98, flip-flop 92 produces $f/8$ output pulses, and so forth. Consequently, by manipulating the encoder 82 so as to open desired ones of the AND gates of the multiplier 70 by appropriate positive inputs at 80, 94, etc., the output 10 of the OR gate 100 can be made to vary by integers through the entire range of 0 to $f - f/1024$ pulses per unit time.

Figure 5:
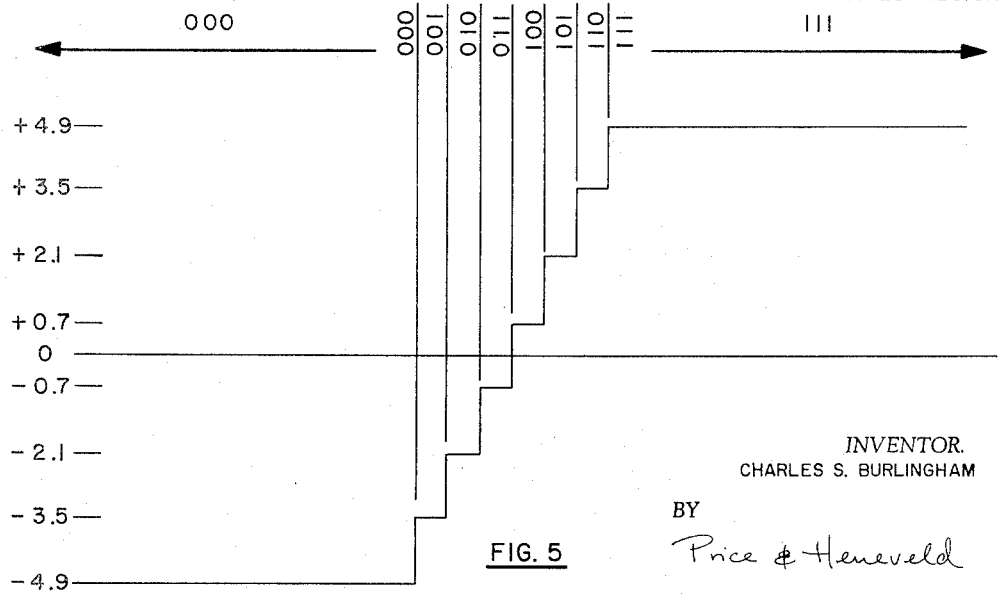
FIG. 5 graphically illustrates the two modes of operation of the device.

The command pulse train 10 issuing from the OR gate 100 is fed to the AND input 12 of the up limit gate 14. In the absence of a signal at the NOT input 16 of the up limit gate 14, the command pulse train passes unaltered through the gate 14 into the input 60 of the three-stage bidirectional counter 30. The additive input pulse 60 energizes the trigger terminal 102 of the least-significant-digit flip-flop 104. This puts the flip-flop 104 into the "one" condition in which it energizes the input 106 of AND gate 108, the input 110 of AND gate 112, and the input 114 of AND gate 116. At the same time, the "one" condition of flip-flop 104 applies a positive voltage to the weighted resistor 118 of the digital analogue converter 32, which has a resistance value of 4R. In a typical embodiment, a positive voltage applied to weighted resistor 118 alone may correspond to an increment of 1.4 volts output from the digital-analogue converter 32. Consequently, in the initial condition with all flip-flops of the counter 30 in the "zero" condition, and resistors 118, 126, 134 connected to a negative voltage, the analogue output 120 would be −4.9 volts, whereas in the just described instance in which flip-flop 104 is in the "one" position but the other two flip-flops are still in the "zero" condition, the analogue output 120 would be −3.5 volts (see also FIG. 5).

Because of the energization of input 106 of the AND gate 108, the next command pulse 60 appearing at input 122 of AND gate 108 will pass through the AND gate 108 and trigger flip-flop 124, as well as flip-flop 104. Triggering of flip-flop 124 applies a positive voltage to the weighted resistor 126 which has a value of 2R and triggering of flip-flop 104 applies a negative voltage to resistor 118, producing an analogue output, in the example chosen, of −2.1 volts.

Successive command pulses 60 cause continued operation of the counter 30 in the well-known manner of a binary counting chain, increasing the analogue output of the converter 32 by 1.4 volts with each pulse 60 in the example chosen. Eventually, the appearance of a signal at the output 128 of AND gate 112 triggers the most-significant-digit flip-flop 130. This results in energization of the input 132 of AND gate 116, and also of weighted resistor 134 which has a value of R and thus produces an analogue output of +0.7 volt. As the count proceeds, input 136 of AND gate 116 is eventually energized by flip-flop 124 going to its "one" condition, and finally input 114 of AND gate 116 is energized by flip-flop 104 going to its "one" condition. At this point, the counter 30 is saturated, and the AND gate 116 passes a "stop counting" signal 138. The signal 138 is applied to the NOT gate 16 of the up limit gate 14 and prevents passage of any further command pulses 10 through the gate 14. At this point, with all three of the weighted resistors 118, 126 and 134 energized, the analogue output in the example chosen remains steady at its maximum value of +4.9 volts (see FIG. 5).

The analogue output 120 is fed to a damping circuit 34 which smooths the sharp voltage steps, and thence to a controller 36 which, in the embodiment of the invention shown in FIG. 2, may consist of a modulator 37 and amplifier 39 whose output is a torgue signal T to the motor 38.

The speed of the motor 38 is read by a quantizer or pulse generator 40 consisting, in FIG. 2, of an optical or magnetic bit carrying disc 140 and pick-off 142. As the motor 38 rotates, pulse signals are induced in the pick-off 142 to form the feedback pulse train 41. The randomly phased feedback pulse train 41 is fed to the reset input 144 of an anti-coincidence flip-flop 146. The "zero" condition output of the flip-flop 146 is fed to one input of the AND gate 148 whose other input is energized by the pulse train 68 from the crystal-controlled oscillator 64. The synchronization of the pulse trains 66, 68 is such that pulses cannot occur simultaneously on the pulse trains 66 and 68. The output of the AND gate 148 is the feedback signal 44 and is also applied to the set input 150 of flip-flop 146. It will be seen that pulses of the pulse train 44 can occur only synchronously with pulses of pulse train 68 which, as has been pointed out, are non-coincident with the pulses of train 66 that produce the command signal 10.

The non-coincident feedback pulse train 44 normally passes through the down limit gate 48 in the same manner as the command pulse train passes through the up limit gate 14. The resulting count-down signal 62 is applied to the set and reset terminals of the flip-flop 104 and to one of the inputs of each of the AND gates 152, 154 whose output is connected to the set and reset terminals of flip-flops 124 and 130, respectively. The effect of pulses 62 is identical to that of pulses 60, except that they cause the counter 30 to count backwards instead of forwards. When the counter is completely empty (i.e. all flip-flops are in the "zero" condition), an output 156 is produced from the AND gate 158, and this "stop counting" output 156 is applied to the NOT input 50 of the down limit gate 48 where it prevents further occurrence of pulses 62. In this condition, the analogue voltage 120 is —4.9 volts (see FIG. 5). This condition causes maximum reverse torque to be applied to the motor 38 until it slows down sufficiently for the feedback pulse rate to drop below the command pulse rate.

Anti-coincidence circuit

Figure 3:
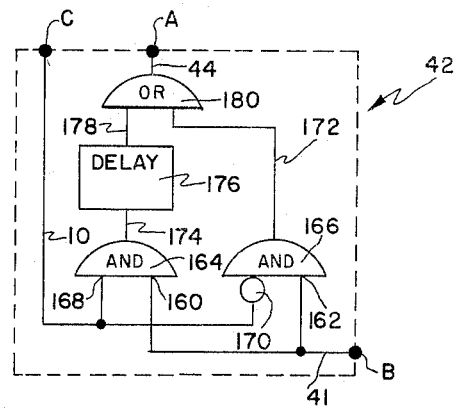
FIG. 3 is a logic diagram illustrating the operation of the anti-coincidence circuit of this invention.

In accordance with the invention, the circuit of FIG. 2 can be considerably simplified by using the anti-coincidence circuit shown in logic form in FIG. 3. The device of FIG. 3 can be substituted in the logic diagram of FIG. 2 by simply eliminating the pulse train 68 and the anti-coincidence circuit 42 between point A and B. The device of FIG. 3 can then be connected in lieu thereof in FIG. 2 at points A, B and C.

In the circuit of FIG. 3, the randomly phased feedback pulse train 41 is fed to the inputs 160 and 162, respectively, of AND gate 164 and NOT-AND gate 166. The command pulse train 10 is applied to the input 168 of AND gate 164 and to the NOT input 170 of NOT-AND gate 166. If the feedback pulses 41 and the command pulses 10 are non-coincident, there will be no output from the AND gate 164 but the feedback pulses 41 will pass unchanged through the NOT-AND gate 166 and will appear in the output 172. If the feed-back pulses 41 and the command pulses 10 are coincident, on the other hand, the command pulse at the NOT input 170 will block AND gate 166, and an output pulse will instead appear at the output 174 of AND gate 164. The output pulse 174 is fed through a delay line 176 from which it emerges as delayed output 178. The outputs 172 and 178 are fed to an OR gate 180 whose output becomes the non-coincident feedback pulse train 44 supplied to the down limit gate 48 (FIG. 2).

It will be seen that with this arrangement, a feedback pulse passes through the anti-coincidence circuit unaltered if it is non-coincident with a command pulse. On the other hand, if it is coincident with a command pulse, it is delayed sufficiently to prevent coincidence of counter input pulses 60 and 62. The device of FIG. 3 is not only simpler than the conventional anti-coincidence circuit shown in FIG. 2, but it also dispenses with the pulse train 68 and the synchronization means in the oscillator 64 necessary to synchronize it with the pulse train 66; and furthermore, the anti-coincidence circuit of FIG. 3 prevents coincidence regardless of the timing of the command pulses 10, and is thus immune to delays which may occur as a result of a malfunction in the multiplier 70.

Operation

It will be seen that if the command pulse train 10 and the feedback pulse train 44 contain an identical number of pulses per unit time, the total count stored in the binary counter 30 will remain constant. If the repetition rate of the command pulse train increases, the output 60 of the up limit gate 14 will add digits faster than the output 62 of the down limit gate 48 can subtract them. Consequently, the total count stored in the binary counter 30 will rise. This in turn causes the bipolar D.C. voltage fed to the lead network 34 to increase algebraically, and the controller 36 is therefore operated in a manner such as to increase the forward torque applied to the motor 38. The resulting increase in the angular velocity of motor 38 increases the repetition rate of the feedback pulse train 41 generated by the quantizer 40 until it reaches the repetition rate of the command pulse train 10.

Because there is of necessity a time lag between the increase of the D.C. voltage 33 as a result of the new command rate and the corresponding speed increase of the motor 38 which compensatingly increases the feedback rate, the count in counter 30 will overshoot the equilibrium point and will thus cause the motor to exceed the new commanded speed. As soon as this happens, the count in counter 30 decreases, the D.C. voltage decreases, and the forward torque applied to the motor 38 decreases. Again because of the time lag, the count will undershoot the equilibrium point and the motor will slow down below the new commanded speed. The motor thus enters into damped velocity oscillations centered about the new commanded speed. It is the purpose of lead network 34 to damp these oscillations and to quickly stabilize the angular velocity of the motor at the proper value.

When the motor is running at the commanded speed, it will actually oscillate about the command speed. This is due to the fact that it is not practically possible for a specific D.C. voltage 33 corresponding to any discrete count to cause the motor 38 to run continuously at exactly the commanded speed. The slight discrepancy between the motor speed and the commanded speed causes the count to periodically increase by one unit and then, as a result of the acceleration of the motor caused thereby, to decrease again by one unit.

It will be seen, however, that although the motor speed varies back and forth, the average motor speed remains precisely constant because in order for the counter to remain in equilibrium, the total number of feedback pulses produced in any given time interval must always be within plus or minus one pulse of the total number of command pulses produced during the same time interval. It follows that the accuracy of the average velocity of motor 38 in the equilibrium condition is essentially equal to the accuracy of the pulse repetition rate of the command train 10.

The magnitude of the oscillatory speed variations in the equilibrium condition can be reduced by increasing the number of counter stages, and the period of oscillation can be reduced by increasing the repetition rate of the pulse trains, in accordance with well-known principles.

Bidirectional control

Figure 4:
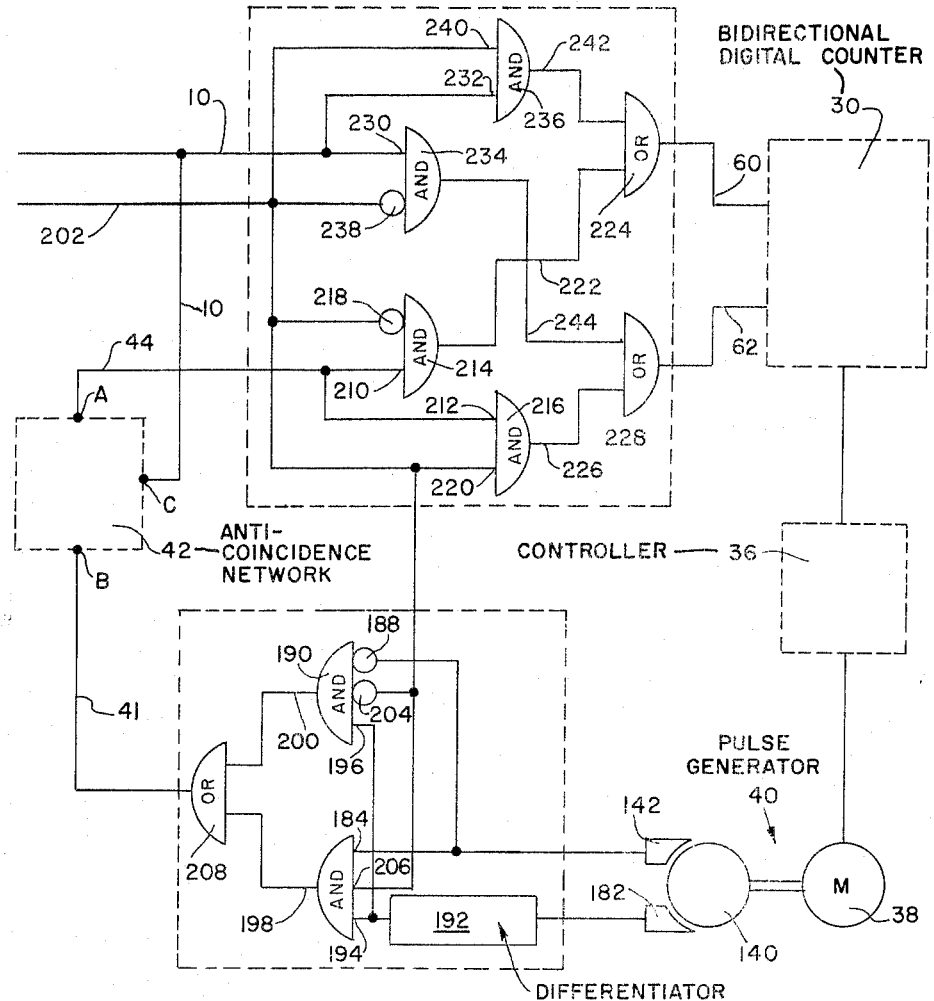
FIG. 4 is a logic diagram of a bidirectional control circuit according to this invention.

FIG. 4 shows a manner in which the device of this invention can easily be adapted to bidirectional control of the motor 38. In that figure, the quantizer 40 may consist, for example, of a magnetic or optical bit carrying disc 140 and a pair of pick-offs 142 and 182 which are displaced in phase by, say, 90°. The signal from pick-off 142 is fed directly to the input 184 of an AND gate 186 and the NOT input 188 of a NOT-AND gate 190. The signal from pick-off 182, on the other hand, is fed through a differentiator 192 to the inputs 194 of gate 186 and 196 of gate 190. At the stated phase displacement between pick-offs 142 and 182, the spike output of the differentiator 192 will be coincident with the pulse from pick-off 142 if the motor turns in one direction, and non-coincident if it turns in the other. Thus, it will be seen that an output 198 from gate 186 can occur only if the motor is turning in one direction, and an output 200 from gate 190 can occur only if the motor is turning in the other direction.

A command sign bit 202 indicative of the desired direction of rotation is fed to the NOT input 204 of the NOT-AND gate 190 and to the AND input 206 of the AND gate 186. Consequently, an output 198 or 200 can occur only when the direction of rotation of the motor is the same as that commanded by the command sign bit 202. The outputs 198 and 200 are fed to an OR gate 208 whose output constitutes the randomly phased feedback pulse train 41. This feedback pulse train is applied to the terminal B of the anti-coincidence circuit 42 of FIG. 3. In the same manner as previously described, the command pulse train 10 is applied to terminal C of the anti-coincidence circuit 42, and a non-coincident feedback pulse train output 44 thereupon appears at terminal A of the anti-coincidence circuit 42.

The non-coincident feedback pulse train 44 is applied to the inputs 210 and 212 of NOT-AND gate 214 and AND gate 216, respectively. The command sign bit 202 is applied to the NOT input 218 of the gate 214 and to the input 220 of gate 216. The output 222 of the NOT-AND gate 214 is applied to the OR gate 224 to become the count-up signal 60. The output 226 of the AND gate 216, on the other hand, is applied to the OR gate 228 and becomes down-down signal 62.

Likewise, the command pulse train 10 is applied to inputs 230 and 232 of NOT-AND gate 234 and AND gate 236, respectively. The command sign bit 202 is applied to the NOT input 238 of the gate 234 and to the input 240 of gate 236. The output 242 of the AND gate 236 is applied to the OR gate 224 and becomes the count-up signal 60. The output 244 of the NOT-AND gate 234, on the other hand, is applied to the OR gate 228 and becomes the count-down signal 62. It will be seen from a study of FIG. 4 that output 222 can coexist only with output 244, and that output 226 can coexist only with output 242. Consequently, the presence of a command sign bit 202 feeds the command pulse train 10 into the bidirectional counter 30 as the count-up signal 60 and the feedback pulse train 44 as the count-down signal 62. Conversely, the absence of the command sign bit 202 feeds the command pulse train 10 into the counter 30 as the count-down signal 62 and the feedback pulse train 44 as the count-up signal 60.

Thus, if the command sign bit 202 is present and the motor 38 is turning backwards, no feedback pulse train 41 can appear in the system. The count stored in the counter 30 will therefore increase and result, through the action of the control system 36, in a heavy forward torque on motor 38. This forward torque will eventually cause reversal of the motor 38, whereupon a feedback pulse train 44 does appear as a count-down signal 62 and stabilize the motor velocity in accordance with the command pulse signal in the manner heretofore described. Conversely, if the command sign bit 202 is removed and the motor 38 is turning in the forward direction, the command pulse train 10 will be applied as a count-down signal 62, and the count stored in the bidirectional counter 30 will diminish until a heavy reverse torque is applied to the motor 38 to cause it to reverse its direction of rotation and stabilize in the reverse direction at the velocity commanded by the pulse train 10.

It will be seen that the present invention provides a simple, effective, and surge-proof digital motor velocity control system. Obviously, the teachings of the invention can be carried out in many different ways, of which the embodiment shown and described herein is merely illustrative. The invention is therefore not to be deemed limited by the embodiment shown and described, but only by the scope of the following claims.

I claim:

1. In a digital motor control servo system having a source of command pulses indicative of a desired motor speed, a source of feedback pulses indicative of the actual motor speed, a reversible binary counter connected to said sources so as to accumulate the difference between the total numbers of pulses delivered by each source, and control means for varying the motor speed in accordance with the accumulated count in said counter, the improvement comprising inhibition means connected between said sources and said counter and to the output of said counter to prevent pulses from reaching said counter whenever such pulses would oversaturate said counter.

2. The improvement of claim 1, which said inhibition means comprise a gate interposed between one of said pulse sources and said counter, and means for blocking said gate when all stages of said counter are in a predetermined condition.

3. A digital motor control system, comprising: a reversible binary counter; a source of command pulses whose repetition rate is a function of a desired motor speed, said source being connected to said counter so as to actuate it in a first counting direction; a motor; control means interposed between said counter and motor and connected to apply to said motor a driving torque proportional to the count stored in said counter; quantizer means associated with said motor to produce a pulse train whose repetition rate is a function of the actual motor speed; anti-coincidence means connected to said pulse source and to said quantizer means for producing a feedback pulse train whose repetition rate is the same as that of the pulse train produced by said quantizer means but whose pulses are non-coincident with said command pulses; the output of said anti-coincidence means being connected to said counter to actuate it in a second counting direction; first gate means interposed between said pulse source and said counter to block said command pulses when said counter is saturated in said first counting direction; and second gate means interposed between said quantizer means and said counter to block pulses indicative of actual motor speed when said counter is saturated in said second counting direction.

4. A bidirectional digital velocity control system for a motor, comprising: a command input including a velocity signal represented by the repetition rate of a pulse train and a direction signal represented by the level of a two-level voltage; a reversible binary counter having an additive input and a subtractive input; means governed by said direction signal for selectively applying said command pulse train to one of said inputs; quantizer means associated with said motor for producing a feedback pulse train whose repetition rate is proportional to the velocity of said motor; means governed by said direction signal for applying said feedback pulse train to the other of said inputs; means for sensing the direction of rotation of said motor; blocking means associated with said last-named means and responsive to said direction signal for preventing said feedback pulse train from being supplied to said counter unless said motor is rotating in the commanded direction; and control means for applying to said motor a torque whose direction and magnitude are governed by the total pulse count stored in said counter.

5. The device of claim 4, in which said means for selectively applying pulse trains to the inputs of said counter comprise a pair of gates for each of said pulse trains, one gate of each of said pairs being connected to said additive input and the other to said substractive input, and the gating inputs of all of said gates being connected to receive said direction signal, one of said gating in each gate pair being an AND input, and the other being a NOT input.

6. The device of claim 4, further comprising anti-coincidence means interposed in the circuit of one of said pulse trains and connected to the other for delaying any pulse of said one pulse train for a predetermined time if and only if it is coincident with a pulse of said other pulse train.

7. The device of claim 6, in which said predetermined time is less than the pulse interval corresponding to the highest repetition rate which any part of the system is capable of producing.

8. In a digital servo system having a command pulse source, a feedback pulse source, and a reversible binary counter connected to said pulse sources, the improvement comprising a nonsynchronous anti-coincidence circuit interposed between one of said sources and said counter and connected to the other of said sources; said circuit including delay means for delaying pulses from said one source, and gating means for short-circuiting said delay means in the absence of a pulse from said other source.

9. A nonsynchronous anti-coincidence circuit for eliminating pulse coincidence in a pair of pulse trains, comprising: a first input; a second input; a pulse train output; inhibition gate means; AND gate means; said first input being connected to an input of said AND gate means and to the NOT input of said inhibition gate means; said second input being connected to the other input of said AND gate means and to the AND input of said inhibition gate means; delay means connected to the output of said AND gate means; and means connecting the outputs of said inhibition gate means and of said delay means to said pulse train output.

10. The device of claim 9, in which the delay introduced by said delay means is less than the pulse interval corresponding to the highest repetition rate of which said pair of pulse trains are capable.

11. In a digital servo system having a command pulse source, a feedback pulse source, and a reversible pulse counting means connected to said pulse sources for algebraically counting pulses from both to arrive at the difference therebetween, the improvement comprising a nonsynchronous anti-coincidence circuit interposed between one of said sources and said counting means and connected to the other of said sources; said circuit including delay means for delaying pulses from said one source, and gating means for short-circuiting said delay means in the absence of a pulse from said other source.

References Cited by the Examiner

UNITED STATES PATENTS

| 2,867,724 | 1/59 | Olson. | |
|---|---|---|---|
| 2,874,343 | 2/59 | Steele. | |
| 2,964,252 | 12/60 | Rosenberg. | |
| 2,996,649 | 8/61 | Leslie | 318—314 |
| 3,064,173 | 11/62 | Breen et al. | 318—312 |
| 3,110,853 | 11/63 | Jones | 318—312 |

JOHN F. COUCH, *Primary Examiner.*